Sept. 12, 1950   J. C. RICHARDSON   2,522,195
PIPE CONNECTION
Filed Jan. 18, 1947

INVENTOR.
James C. Richardson
BY
Johnson, Kline and Hensel
ATTORNEYS

Patented Sept. 12, 1950

2,522,195

UNITED STATES PATENT OFFICE 2,522,195

PIPE CONNECTION

James C. Richardson, Waterbury, Conn., assignor to The Brockway Company, Naugatuck, Conn., a corporation of Connecticut Application January 18, 1947, Serial No. 722,771

2 Claims. (Cl. 285—86)

This invention relates to coupling or connecting means for threadless pipe, tubing, conduit and the like, particularly for connecting the same to other or similar structures, and to form a leaktight connection therewith.

In my co-pending applications, Serial Nos. 702,026, filed October 8, 1946 and 716,370, filed December 14, 1946, I have disclosed connecting means for ductile or bendable threadless pipe, wherein a ductile pipe wall is upset to form a flange of double-walled thickness, extending in radial direction therefrom, said flange cooperating with coupling members between which it is clamped to form a leaktight connection therewith. The term "pipe" is used herein to mean any form of hollow elongate structure ordinarily called pipes, tubes, tubing or conduit.

This invention relates to a modification of the couplings described in my aforesaid co-pending applications, especially adapted for ductile pipe when the character of the material of which the pipe is made makes the formation of a permanently tight joint between the coupling members and the upset flange relatively difficult, for example, by reason of the extreme rigidity or ductility of said material.

In certain of the couplings disclosed in my aforesaid applications, the upset flange was placed at the end of the pipe so that by making the bore of the opposite coupling member to which the pipe is connected the same as the internal diameter of the pipe, a passage of uniform diameter was formed through the coupling. In other constructions, however, in which the upset flange was formed a short distance from the end of the pipe with an end portion of the pipe projecting therefrom, the projecting pipe end entered the bore of the opposite coupling member, so that the passage through the coupling was varied at least by the thickness of the walls of the pipe. The extending end portion of the pipe entering the bore of a coupling member is ordinarily received therein with a sliding fit so that engagement of the end of the pipe with the walls of the bore afforded no substantial support against minor displacement or vibration of the pipe in lateral direction within the coupling.

In cases in which the pipe wall is relatively thin and consequently frangible, or when the walls of the flange are of relatively ductile material, such as soft copper, so that the pipe enclosed by the coupling is relatively susceptible to excessive deformation upon application of external forces or vibration, it is desirable to provide additional support for the walls of the pipe at a point spaced from the clamped flange. A similar situation arises when the pipe is of exceptionally rigid material, so that the pipe wall can cooperate with a surrounding wall or bore to increase the rigidity of the coupling; or in cases where the formation of a leaktight joint with the upset flange is rendered difficult by the rigidity of the material of the flange.

In accordance with this invention, the end portion of the pipe extending beyond the flange is not merely enclosed in the bore of the coupling member receiving the same as by a sliding fit, but is compressed against the wall of the bore in said coupling member, providing added support to prevent deformation or displacement of the pipe in the coupling and reinforcing the support provided by the clamped upset flange.

Thus, in accordance with this invention, an upset double thickness flange is formed in a ductile pipe at a point spaced from the end of the pipe, and the end portion of the pipe projects into the opposite coupling member. The bore of the latter is preferably formed so as to provide a passage of uniform diameter through the coupling despite the fact that the end portion of the pipe projects into the same, by providing a counterbore in the coupling member receiving the end of the pipe, said counterbore terminating in an abutment against which the end of the pipe is seated, while the remainder of the bore is of the same diameter as the inside of the pipe.

Moreover, the counterbore is shaped so as to compress the extending end portion of the pipe within its walls, thus forming a rigid support for the end portion of the pipe against lateral displacement, and thereby reinforcing the said effect of the flange-engaging surfaces of said coupling members when the flange is clamped between them.

This is accomplished, in accordance with my invention, by constructing the counterbore of slightly less length than the extending end portion of the pipe received thereby, so that the latter is compressed in axial direction when the coupling members are forced into clamping engagement with the flange. Axial compression of said end portion of the pipe tends to expand the same in radial direction, so that the walls of said end portion are forced outward against the walls of the counterbore in the coupling member.

In one form of the invention, the abutment against which the end of the pipe is seated, is constructed as a flat annular shoulder lying in a plane at right angles to the axis of the coupling, while in another form of the invention, the abutment can be undercut to form an interlock with the end of the pipe. The latter can be preshaped to fit said undercut abutment, or deformed to conform therewith when forced axially into engagement with the abutment.

Moreover, if desired, the walls of the counterbore can be tapered inwardly so that the end portion of the pipe, upon entering the counterbore, are further compressed against the walls of the same by the constricting effect of the tapering on the end portion of the pipe as it enters the counterbore.

By virtue of the compression of the walls of the projecting ends of the pipe against the walls of the counterbore in the coupling member, the pipe is positively supported against lateral displacement, and if desired, a leaktight connection can be formed between the projecting end of the pipe and the wall of the counterbore, as well as with the abutment engaging the end of the pipe.

Other features and advantages of the invention will appear from the following description, taken in conjunction with the accompanying drawing wherein.

Figure 1:
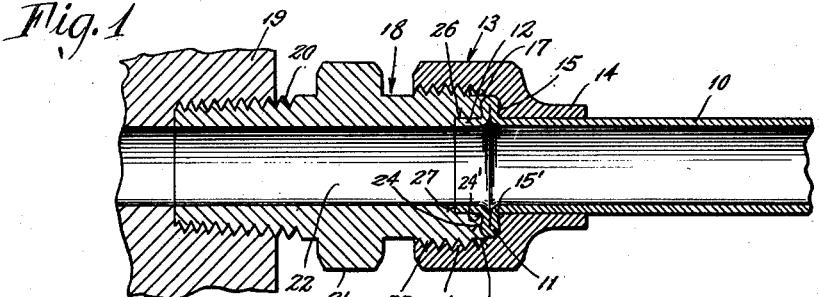
Figure 1 is an axial cross-sectional view of a coupling in accordance with the invention.

Referring to the drawings, the coupling of Fig. 1 comprising a length of ductile pipe 10, for example, a pipe of ductile metal, such as copper, steel, tin, zinc, aluminum or alloys of these materials, having adjacent an end thereof, a double-thickness flange or upset portion 11, extending substantially in radial direction therefrom, and an undeformed end portion 12 of the pipe extending out from said flange.

The upset flange 11 can be made, for example, by the method disclosed in my co-pending application, Serial No. 702,026, of October 8, 1946, wherein an unconfined length of the pipe adjacent the end thereof, is subjected to axial compression while confining the pipe walls on opposite sides of said unconfined portion against radial expansion. Application of such compression to the unconfined portion of the pipe, causes said portion to expand in the form of an annular ridge or bead, which is then further compressed until the sides thereof are forced together to yield the double walled flange shown in the drawing. In some cases, it is advantageous to support the inner walls of the pipe against constriction during formation of said flange, for example, by insertion of a rigid support such as a mandrel into the bore of the pipe.

A female coupling member 13, having a rearwardly extending sleeve portion 14 with a bore therein corresponding in diameter to the outside diameter of the pipe 10, encircles the latter behind the flange 11. The coupling member 13 has a cavity extending inward from its opposite or front end, of sufficient diameter to receive the upset flange 11, said cavity terminating at a shoulder 15 against which the flange 11 can be seated. Threads 16 extend inward from the mouth of the cavity and are adapted to engage a correspondingly threaded coupling member, said threads preferably terminating at an inner cylindrical portion 17 of said cavity, which extends a short distance inward to join the shoulder 15.

The other coupling member 18 is a male fitting, which can be attached to a structure 19, for example, by a threaded portion 20 at its rear end. It is advantageously provided with a nut portion 21, for example, of hexagonal or square shape, to facilitate its installation on the structure 19. The coupling member 18 has a bore 22 extending therethrough, preferably of the same diameter as the internal diameter of the pipe 10. Extending toward its opposite or front end, the coupling member 18 has a set of external threads 23 for engaging the threads 16 on the coupling member 13. At its front end, the member 18 has a surface 24 conforming substantially in shape to the front side of the upset flange 11. Preferably it also includes a cylindrical portion 25 between the end surface 24 and external threads 23 for telescopically entering the cylindrical portion 17 of the female coupling member 13.

Provision of the telescopical engageable portions 17 and 25 with members 13 and 18 forms, together with the shoulder 15 and end surface 24, an annular space adapted to confine the upset flange 11 on the pipe when the two coupling members are threaded together. In order to prevent the inner edge of the shoulder 15 and of end surface 24 from biting into the material of the flange 11 at its base, the corners 15' and 24' thereof can be slightly rounded, i. e. constructed with a curvature of small radius. As disclosed in my co-pending application, Serial No. 716,370 of December 14, 1946 the flange 11 is compressed within said annular space, and by confining it therein, excessive deformation of the flange is avoided. Moreover, as disclosed in said application, it is advantageous to form the shoulder 15 and end surface 24 of the members 13 and 18 so that they diverge slightly from each other in radial direction adjacent their end peripheries so that when clamped against the flange 11, they force the material thereof radially outward to substantially fill said annular chamber, and thereby entrap the flange 11 within said chamber.

In accordance with the present invention, the coupling member 18 has a counterbore 26, the diameter of which conforms with the outside diameter of the end portion 12 of the pipe, and which is thus adapted to receive said end portion, said counterbore terminating at an abutment 27 for engaging the end of the pipe. The abutment 27 is spaced from the end surface 24 of the coupling member 18 by a distance slightly less than the length of the end portion 12 of the pipe. Thus, when the flange 11 is clamped between the shoulder 15 and end surface 24 of coupling members 13 and 18, the end portion 12 of the pipe is forced against the abutment 27 and thus subjected to axial compression.

In making up the connection with the coupling of Fig. 1, the pipe 10 is inserted with its end portion 12 extending into the counterbore 26 of coupling member 18 until the end of the pipe engages the abutment 27 at the inner end of the counterbore 26. Coupling member 13 is then threaded on to member 18 behind the pipe flange 11 until its shoulder 15 engages the rear surface of said flange. Upon further tightening of member 13 on member 18, flange 11 is clamped firmly between shoulder 15 and end surface 24 of the coupling members, and the metal of the flange is forced to fill the annular cavity formed by said surfaces together with the telescoped cylindrical portions 17 and 25 of the two coupling members. At the same time, end portion 12 of the pipe is subjected to compression in axial direction between the abutment 27 in coupling member 18 and shoulder 15 of the coupling member 13. Such compression tends to expand the end portion 12 of the pipe in radial direction, thus forcing the walls of said end portion outward against the walls of the counterbore 26. Thus, when the connection is fully tightened, a seal is formed not only between the flange 11 and end surface 24 of coupling member 18, but also between abutment 27 and the end of the pipe, and further between the exterior of the end portion 12 of the pipe and the walls of the counterbore 26.

The pipe 10 is firmly held against lateral and longitudinal displacement, the supporting effect of the flange 11 clamped by the coupling members being reinforced by the compressed engagement of the end portion 12 with the walls of counterbore 26. Thus, the pipe is much more firmly supported against lateral displacement than in the case of a coupling in which the flange alone is forcibly clamped between the coupling members.

Figure 2:
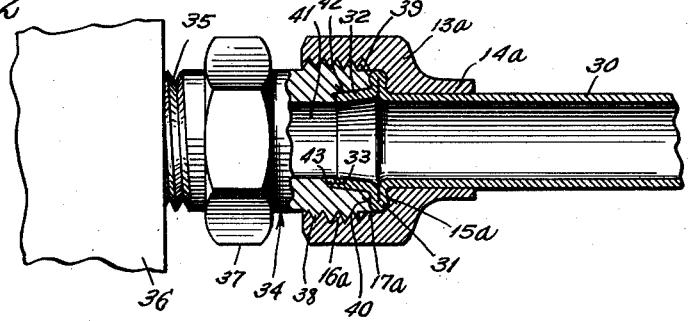
Fig. 2 is a side view, partly in axial cross-section, of a modified form of my coupling.

A second connection embodying my invention, is shown in Fig. 2. This embodiment comprises a female coupling member 13a, similar in all respects to coupling member 13 of Fig. 1, the corresponding parts being identified by the same reference numerals with the postscript "a." Thus, the coupling member 13a has a rearwardly extending sleeve 14a, with a bore conforming to the outside diameter of the pipe to be engaged thereby, a cavity in the opposite end of said member having internal threads 16a, a cylindrically walled portion 17a, and a flange-engaging shoulder 15a, shaped to fit the rear side of an upset double-walled flange 31 adjacent the end of a length of threadless pipe 30. Said length of threadless pipe 30, which has adjacent the end thereof an upset double-wall flange 31, also has an end portion 32 extending outwardly from the flange, said end portion being originally shaped like the end portion 12 of Fig. 1. If desired, however, the end portion 32 can be pre-formed with slightly tapered walls, and its leading end or edge 33 can be made of re-entrant conical shape.

The opposite coupling member 34, like member 18 in Fig. 1, is advantageously provided with means such as a threaded portion 35 at its rear end for fastening it in a correspondingly threaded orifice in a structure 36 to which it is to be secured, and a nut portion 37 for engaging a wrench. The opposite or front end of member 34 has external threads 38 for engagement with the internal threads 16a of member 13a, and a short cylindrical portion 39 extending outward from the threads 38 for telescopically entering the cylindrical portion 17a of the cavity of coupling member 13a, while the front end surface 40 of coupling member 34 is shaped to engage and fit the front side of the flange 31 on pipe 30. The coupling member 34 also has a bore 41 extending therethrough, preferably of the same diameter as the internal diameter of the pipe 30.

In accordance with the invention, the coupling member 34 has, in addition, a counterbore 42 entering the same from the front end thereof, said counterbore having gradually inclined walls, tapered inwardly and terminating at an undercut annular abutment 43 for engaging the end 33 of the pipe 30, the length of said counterbore being slightly less than that of the end portion 32 of the pipe.

In making up the connection of Fig. 2, the end portion 32 of pipe 30 is inserted into the counterbore 42 of coupling member 34 until its end surface 33 engages the undercut abutment 43 at the inner end of the counterbore, or until its end encounters the tapered walls of the counterbore 42. Coupling member 13a is then threaded onto coupling member 34 until its shoulder 15a engages the rear side of flange 31. Further tightening of the coupling members forces the end portion 32 of the pipe against abutment 43, molding the edge 33 thereof (if the edge is not pre-formed) to conform with the undercut shape of abutment 43, and forming an interlock therewith resisting any tendency of the pipe end to spring past said abutment and enter the bore 41. At the same time the end portion 32 is compressed in axial direction, causing it to expand outwardly and press against the gradual tapered walls of the counterbore 42, thus providing positive support for the end portion of the pipe in addition to support provided by the clamping of the flange 31 between the flange-engaging surfaces 15a and 40 of the two coupling members. The pressure of the end portion 32 against the walls of the counterbore is further reinforced by the constricting effect of the taper on the pipe and if the latter is originally larger than the inner end of the counterbore. As in the coupling of Fig. 1, flange 31 is forced outward to fill the annular space between the end surface 40 and shoulder 15a, and is confined within said space against excessive expansion.

A leak-tight engagement is thus formed between the end portion of the pipe and the counterbore between the end of the pipe and the abutment, as well as between the clamping surfaces of the coupling members and the upset flange on the pipe. This arrangement insures a leak-tight connection with steel pipe, as well as a reinforced support for highly ductile pipe, such as copper tubing.

Figure 3:
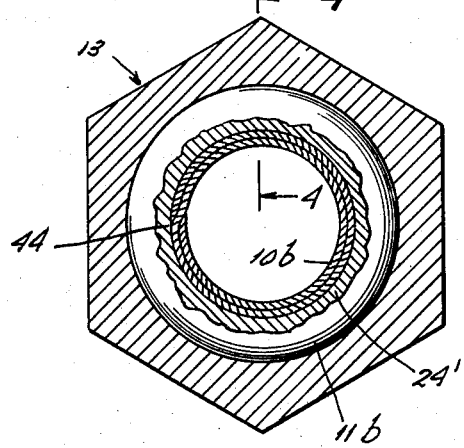
Fig. 3 is a transverse cross-section along the line 3—3 in Fig. 4, showing the coupling of Fig. 1 employed with welded steel tubing of the Bundy type.
Figure 4:
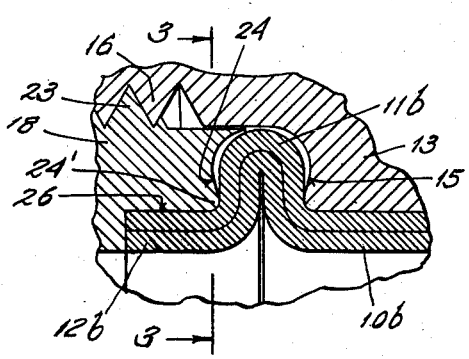
Fig. 4 is an enlarged detail in axial cross-section along the line 4—4 of the coupling of Fig. 3.

Figs. 3 and 4 show the coupling of Fig. 1 applied to an upset pipe 10b of steel tubing of the Bundy type which is made by wrapping sheet steel longitudinally upon itself, and welding the superposed plies together. As a result, the tubing has a longitudinal seam forming a groove 44 along the tubing which often forms a channel for leakage when the tubing is assembled with a coupling.

However, when the pipe 10b having a double walled upset flange 11b and an end portion 12b projecting from the flange, is assembled with the coupling of Fig. 1, the projecting end portion 12b, when axially compressed within the counterbore of coupling member 18 is expanded outward with great force against the walls 26 of the counterbore, preventing the pipe from turning relative to the member 18, as member 13 is tightened thereon. By constructing the walls 26 of the counterbore of relatively ductile metal such as brass, the metal thereof is forced into the groove 44 thus sealing the same against leakage.

The rounded corner 24' at the junction of the counterbore 26 and flange engaging surface 24 of coupling member 18 is forced against the surface of the pipe 10b with great pressure at the base of flange 11b, as the coupling is tightened. Since the pipe is held against turning, the metal of the corner 24' is deformed into the groove 44 forming a secure seal at this point, and preventing any leakage between the pipe and coupling member. Construction of surfaces 24 and 15 so that they diverge in radial direction insures adequate pressure at shoulder 24 to produce the aforesaid sealing effect.

Variations can be made in the construction of my invention without departing from the scope thereof. Thus, the arrangement of the interengageable threads whereby the coupling members are brought together can be reversed so that the female member engages the front instead of the rear of the upset flange, and includes the counterbore and abutment for engaging the end portion of the pipe, while the male member has merely a bore fitting the outside diameter of the pipe and its flange-engaging surface fits against the rear of the flange on pipe.

Other variations and modifications can be made within the scope of the invention and portions of the improvements can be used without others.

I claim:

1. A coupling for threadless ductile pipe having an upset double thickness flange adjacent an end thereof and extending substantially in radial direction therefrom, and an end portion of the pipe extending outward from said flange, said coupling comprising a pair of coupling members, one member having a bore for slidably receiving the pipe behind the flange, a surface facing in axial direction for clamping against the rear of the flange, and the other of said members having a surface for clamping against the front of the flange and a counterbore for receiving the outwardly extending end portion of the pipe, and terminating at an annular abutment for engaging the end of the pipe, the length of said counterbore being slightly less than the length of the extending end portion of the pipe; and draft means for forcing said coupling members together to clamp said upset flange between said flange-engaging surfaces, and to compress the end of the pipe against said abutment, whereby the walls of said outwardly extending portion of the pipe are expanded outward against the walls of said counterbore.

2. A coupling as defined in claim 1, wherein the walls of said counterbore are tapered gradually inward toward said abutment, said extending end portion of the pipe being forced against the walls of said tapered portion of the counterbore upon clamping said flange between said flange-engaging surfaces in response to operation of said draft means.

JAMES C. RICHARDSON.

REFERENCES CITED

The following references are of record in the file of this patent:

UNITED STATES PATENTS

| Number | Name | Date |
|---|---|---|
| 1,817,854 | Sorensen | Aug. 4, 1931 |
| 2,037,625 | Goepel et al. | Apr. 14, 1936 |
| 2,251,717 | Parker | Aug. 5, 1941 |
| 2,296,993 | Gerry | Sept. 29, 1942 |
| 2,306,702 | Koerner | Dec. 29, 1942 |
| 2,469,851 | Stecher et al. | May 10, 1949 |

FOREIGN PATENTS

| Number | Country | Date |
|---|---|---|
| 393,419 | Great Britain | June 8, 1933 |